United States Patent [19]

Ishiyama et al.

[11] Patent Number: 5,700,867
[45] Date of Patent: Dec. 23, 1997

[54] AQUEOUS DISPERSION OF AN AQUEOUS HYDRAZINE-TERMINATED POLYURETHANE

[75] Inventors: Masaaki Ishiyama; Takeaki Matuura; Takashi Mihoya; Shinya Fujimatsu; Masayoshi Utsugi; Kouichi Iibuchi, all of Tokyo, Japan

[73] Assignee: Toyo Ink Manufacturing Co., Ltd., Tokyo, Japan

[21] Appl. No.: 636,275

[22] Filed: Apr. 29, 1996

Related U.S. Application Data

[63] Continuation-in-part of Ser. No. 316,039, Sep. 30, 1994, abandoned.

[30] Foreign Application Priority Data

Oct. 1, 1993  [JP]  Japan ................. 5-246554

[51] Int. Cl.$^6$ .................. C08J 3/00; C08K 3/20; C08L 75/00; C08L 51/00
[52] U.S. Cl. ................. 524/539; 524/591; 524/839; 524/840
[58] Field of Search ................. 524/539, 591, 524/839, 840

[56] References Cited

U.S. PATENT DOCUMENTS

| | | |
|---|---|---|
| 3,479,310 | 11/1969 | Dieterich et al. ........... 260/29.2 |
| 3,905,929 | 9/1975 | Noll .......................... 524/591 |
| 4,046,729 | 9/1977 | Scriven et al. ............ 260/29.2 |
| 4,066,591 | 1/1978 | Scriven et al. ............ 260/29.2 |
| 4,178,182 | 12/1979 | Tsubota et al. ............ 96/73 |
| 4,335,029 | 6/1982 | Dabi et al. ................ 524/589 |
| 4,826,894 | 5/1989 | Markusch et al. .......... 523/415 |
| 4,983,662 | 1/1991 | Overbeek et al. ......... 524/591 |
| 4,992,507 | 2/1991 | Coogan et al. ............. 524/591 |
| 5,043,381 | 8/1991 | Coogan et al. ............. 524/591 |
| 5,137,967 | 8/1992 | Brown ....................... 524/840 |

FOREIGN PATENT DOCUMENTS

| | | |
|---|---|---|
| 0300335 | 7/1988 | European Pat. Off. . |
| 0332326 | 2/1989 | European Pat. Off. . |
| 2107338 | 10/1982 | United Kingdom . |

*Primary Examiner*—Patrick Niland
*Attorney, Agent, or Firm*—Knobbe, Martens, Olson & Bear, LLP

[57] ABSTRACT

An aqueous dispersion of an aqueous polyurethane having an ionic functional group, polyoxyethylene units and terminal hydrazine functional groups is provided. Content of the ionic functional group is about 5 to about 180 milliequivalent per 100 g of the aqueous polyurethane, and content of the polyoxyethylene unit is about 20% by weight or less of a weight of the aqueous polyurethane. The aqueous dispersion is used for a composition for ink, coating or adhesive. Storage stability, water resistance, pigment dispersibility, and adhesion to various kinds of substrates, particularly non-polar substrates, of the aqueous dispersion and the composition are excellent.

16 Claims, No Drawings

AQUEOUS DISPERSION OF AN AQUEOUS HYDRAZINE-TERMINATED POLYURETHANE

RELATED APPLICATION

The present application is a continuation in part of application Ser. No. 08/316,039, filed Sep. 30, 1994 now abandoned.

FIELD OF THE INVENTION

The present invention relates to an aqueous dispersion of a specific aqueous polyurethane and to a composition containing the aqueous dispersion. More particularly, the present invention relates to an aqueous dispersion which is used for an ink, a coating or an adhesive for metal, wood, paper, leather, glass, fiber, plastic, foamed articles, concrete and the like and in which storage stability, water-resistance, pigment dispersibility and adhesion to various substrates are excellent, and to a composition containing the aqueous dispersion.

PRIOR ART OF THE INVENTION

Dispersing or dissolving a resin used in an ink, a coating or an adhesive into an aqueous medium has conventionally been achieved by using a dispersant or an emulsifier or by the action of a dispersing group, an emulsifying group or a dissolving group (an ionic functional group and/or a nonionic functional group) contained in the resin. It has been generally found that the resins of the latter self-emulsifying or self-dissolving type result in better performance.

Aqueous dispersions or solutions of self-emulsifying or self-dissolving polyurethanes containing ionic functional groups alone have a drawback in that storage stability and water-resistance are inferior even though adhesion to substrates and dispersibility of pigments are relatively good. Therefore, it was proposed for overcoming the drawback that nonionic functional groups alone or a combination of nonionic functional groups and ionic groups should be contained in the resin.

As for the adhesion to substrates, an aqueous resin dispersion having sufficiently satisfactory adhesion to substrates having smooth surfaces, particularly to non-polar substrates having smooth surfaces such as plastics, has not been obtained even though aqueous dispersions having better properties than conventional materials for adhesion to substrates having porous and rough surfaces such as paper have been obtained. As the method for improving the above drawback of the aqueous dispersion, it has heretofore been known that a non-polar material such as a hydrocarbon compound can be added to the aqueous dispersion or that a polyurethane in which a hydrocarbon group is incorporated in the end and/or other parts of the main chain by reaction of a hydrocarbon compound having monovalent or divalent active hydrogen with an organic diisocyanate can be used.

However, the aqueous dispersions of the polyurethane described above and the compositions containing the aqueous dispersions have drawbacks in that dispersibility in water and storage stability are inferior and also in that dispersibility of pigments and adhesion to polar materials are decreased.

As for the polyoxyethylene unit, a method of incorporating polyoxyethylene units in the end and/or other parts of the main chain by reaction of a monovalent or divalent polyethylene glycol with an organic diisocyanate has heretofore been known. The aqueous dispersion of polyurethane obtained by this method has a drawback in that satisfactory properties cannot be obtained because adhesion to substrates and dispersibility of pigments are insufficient even though storage stability and water-resistance are good. Methods of incorporating polyoxyethylene chains as side chains are disclosed in Japanese Patent Application Laid-Open Nos. Heisei 1(1989)-104612 and Heisei 1(1989)-104613. More specifically, 1 mol of an organic diisocyanate is brought into reaction with about 1 mol of a polyethylene glycol monoether. The product is brought into reaction with about 1 mol of a dialkanolamine. Then, the product of this reaction is brought into reaction with an organic diisocyanate to incorporate polyoxyethylene chains as side chains. However, the aqueous dispersion of polyurethane obtained by this method has a drawback in that fluidity is decreased by an increase in viscosity and, in a worse case, gelation of the polyurethane occurs because the unreacted organic diisocyanate remains after the synthetic stages of the intermediate products.

SUMMARY OF THE INVENTION

An object of the present invention is to provide an aqueous dispersion of an aqueous hydrazine-terminated polyurethane in which storage stability, water-resistance, pigment dispersibility and adhesion to various kinds of substrates, particularly non-polar substrates, are excellent. Another object of the present invention is to provide a composition for ink, coating and adhesive in which the aqueous dispersion of the aqueous polyurethane described above is used and which has the excellent properties described above.

In order to achieve the above-described object, the present invention provides an aqueous dispersion of an aqueous polyurethane having ends, which aqueous polyurethane comprises an ionic functional group, polyoxyethylene units, and hydrazine functional groups, but no carbonyl functional groups which react with the hydrazine functional groups, which hydrazine functional groups comprise terminal hydrazine functional groups linked to the ends of the polyurethane, wherein the content of the ionic functional group is about 5 to about 180 milliequivalent per 100 g of the aqueous polyurethane and the content of the polyoxyethylene units is about 20% by weight or less based on the weight of the aqueous polyurethane.

In another aspect of the present invention, in the aqueous dispersion described above, the aqueous polyurethane is a polyurethane having terminal hydrazine functional groups obtained by reaction of: a polymer having terminal isocyanate groups obtained by reaction of a compound (A) having at least one ionic functional group and at least two functional groups reactive with isocyanate group, a compound (B) having polyoxyethylene units and an organic polyisocyanate (C); with (2) a polyhydrazine compound (D).

Still another aspect of the present invention is an aqueous dispersion of an aqueous polyurethane comprising an ionic functional group, polyoxyethylene units and terminal hydrazine functional groups, which aqueous polyurethane is obtained by reaction of: (1) a polymer having terminal isocyanate groups obtained by reaction of: a compound (A) having at least one ionic functional group and at least two functional groups reactive with an isocyanate group; a polyester (F) having polyoxyethylene units, which polyester (F) is obtained by reaction of an organic compound having two hydroxyl groups, a cyclic acid anhydride, and a monomer having one epoxy group and polyoxyethylene units; and an organic polyisocyanate (C); with (2) a polyhydrazine compound, wherein the content of the ionic functional group is approximately 5 to approximately 180 milliequivalent per 100 g of the aqueous polyurethane and the content of the polyoxyethylene units is approximately 20% by weight or less based on the weight of the aqueous polyurethane.

Another aspect of the present invention is an aqueous ink or coating composition comprising one of the aqueous dispersions described above, pigment, water, and optionally, a water-soluble organic solvent, wherein the content of the aqueous polyurethane in the aqueous dispersion is about 2 to about 40% by weight, the content of the pigment is about 2 to about 80% by weight, the total content of water is about 10 to about 96% by weight, and the content of the water-soluble organic solvent is 0 to about 50% by weight, each content based on the weight of the aqueous ink or coating composition.

Another aspect of the present invention is an aqueous adhesive composition comprising one of the aqueous dispersions described above, water, and optionally, a water-soluble organic solvent, wherein the content of the aqueous polyurethane in the aqueous dispersion is about 2 to about 40% by weight, the total content of water is about 10 to about 96% by weight, and the content of the water-soluble organic solvent is 0 to about 50% by weight, each content based on the weight of the aqueous adhesive composition.

DETAILED DESCRIPTION OF THE INVENTION

The content of the ionic functional group in the aqueous polyurethane of the present invention is in the range of about 5 to about 180 milliequivalent per 100 g of the aqueous polyurethane. The content of the polyoxyethylene unit is about 20% by weight or less of the weight of the resin. Particularly, a content of the ionic functional group in the range of about 10 to about 120 milliequivalent and a content of the polyoxyethylene unit of about 10% by weight or less are preferable because good balance between dispersibility in water or storage stability and water resistance can be obtained.

The aqueous polyurethane of the present invention has no carbonyl functional groups which react with the hydrazine functional groups. When carbonyl functional groups, which react with the hydrazine functional groups, are present in an aqueous polyurethane, storage stability of an aqueous dispersion of the aqueous polyurethane deteriorates. Due to the absence of such carbonyl functional groups, storage stability of the aqueous dispersion of the aqueous polyurethane is significantly improved. However, carbonyl groups other than the above carbonyl functional groups reacting with the hydrazine functional groups can be present in the aqueous polyurethane of the present invention. For example, the aqueous polyurethane contains urethane bonds which have carbonyl groups therein, and further, the aqueous polyurethane may include ester bonds, urea bonds, carboxyl groups, and the like. For example, when polyesterpolyol is used as the compound (A), the resultant polyurethane contains ester bonds; when a polymer, which has terminal isocyanate groups obtained by reaction of the compound (A), the compound (B), and the organic polyisocyanate (C), is extended using diamine, the resultant polyurethane contains urea bonds; and when the ionic functional groups are carboxyl groups, the resultant polyurethane contains carboxyl groups. Although these bonds and groups have carbonyl groups, the carbonyl groups do not react with the hydrazine functional groups, so that storage stability will not deteriorate.

The present invention is described in more detail hereinafter.

As the compound (A) having at least one ionic functional group and at least two functional groups reactive with isocyanate group, compounds disclosed in Japanese Patent Publication Showa 43(1968)-9076 can be used. The ionic functional group is a member selected from the group consisting of quaternary ammonium group, tertiary amino group, carboxylate group, carboxyl group, sulfonate group, sulfonic acid group, phosphonium group, phosphinic acid group, sulfuric acid ester group and mixtures of these groups. Among these groups, ionic precursor groups, such as carboxyl group and tertiary amino group, can be easily converted into the ionic groups by the neutralization reaction or the reaction of forming a quaternary compound using ammonia, a tertiary amine, acetic acid, or hydrochloric acid.

Specific examples of the compound (A) having at least one ionic functional group and at least two functional groups reactive with isocyanate group include dimethylolpropionic acid, amino acids, aminosulfonic acids, oxyalkylation products of these compounds, polyesterification products of these compounds, diaminocarboxylic acids, sodium diaminobenzenesulfonate, glycerol monophosphate disodium salt, sodium hydroxyethylphosphonate, sodium dimethylolphosphinate, N-methylethanolamine, polyester polyols having units of sodium 5-sulfoisophthalate, and polyester polyols containing carboxyl groups which are obtained by addition-condensation reaction of a low molecular weight glycol with an aliphatic or aromatic polybasic acid anhydride.

When the polyoxyethylene units are incorporated in the main chain or at the end of the chain of the aqueous polyurethane, examples of the compound (B) having polyoxyethylene units include generally known diols, such as polyethylene glycol and polyethylene glycol-polypropylene glycol copolymer, and monoalcohols which are monoalkyl ethers of these diols. On the other hand, when the polyoxyethylene units are incorporated in side chains of the aqueous polyurethane, examples of the compound (B) having polyoxyethylene units include the following compounds. (1) Diols (E) having polyoxyethylene units in side chains; more specifically, diols having polyoxyethylene units in side chains disclosed in Japanese Patent Application Laid-Open No. Showa 63(1988)-305119, and reaction products of about 1 mol of a dialkanolamine with the reaction product of 1 mol of an organic diisocyanate with about 1 mol of a polyethylene glycol monoalkyl ether which are disclosed in Japanese Patent Application Laid-Open Nos. Heisei 1(1989)-104612 and Heisei 1(1989)-104613. (2) Polyesters (F) obtained by reaction of organic compounds having two hydroxyl groups, cyclic acid anhydrides, and monomers having one epoxy group and polyoxyethylene units. (3) Poly(alkylene oxide) (G) represented by the following general formula (1):

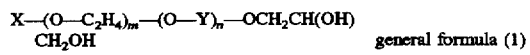
general formula (1)

wherein X indicates a hydrocarbon group having 1 to about 4 carbon atoms, Y indicates a hydrocarbon group having about 3 to about 8 carbon atoms, m indicates an integer of 1 to about 100, and n indicates an integer which is equal to or less than m and not negative.

The organic compound having two hydroxyl groups used in the preparation of the polyester (F) described above includes, for example, a member selected from the group consisting of: low molecular weight diols, such as ethylene glycol, propylene glycol, 1,4-butylene glycol, hexanediol, cyclohexanedimethanol, bisphenol A, and diethylene glycol; high molecular weight diols, such as polyether diols like polyethylene glycol and polyetramethylene glycol, conventional polyester diols, and conventional polycarbonate diols; and mixtures of these diols, The cyclic acid anhydride includes, for example, a member selected from the group consisting of saturated or unsaturated aliphatic dicarboxylic acid anhydrides, such as maleic anhydride, succinic anhydride, itaconic anhydride, and 1,2-cyclohexanedicarboxylic acid anhydride; aromatic dicarboxylic acid anhydrides, such as phthalic anhydride, tetrabromophthalic anhydride, and dichlorophthalic anhydride; heterocyclic dicarboxylic acid anhydrides; and mixtures of these anhydrides.

The monomer having one epoxy group and polyoxyethylene units (referred to as an epoxy monomer hereinafter) includes the compounds represented by the following general formula (2):

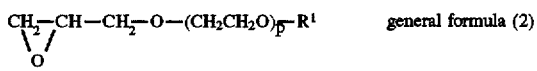
general formula (2)

wherein p indicates an integer of 1 to about 100, and $R^1$ inidicates one of a saturated alkyl group, unsaturated alkyl group, an aryl group, a hetero-ring group, and a polypropylene oxide group having one of these groups at the end thereof. The alkyl group, the aryl group, and the hetero-ring group may be substituted with a halogen atom or may be unsubstituted Specific examples of the monomer include polyethylene glycol methyl glycidyl ether, polyethylene glycol phenyl glycidyl ether, butyl glycidyl ether of polyethylene glycol-polypropylene glycol copolymer, and the like.

In the preparation of the polyester (F), it is considered that an ester compound having a carboxyl group is formed first by reaction of the organic compound having two hydroxyl groups acting as the reaction initiator with the cyclic acid anhydride, and the carboxyl group in the ester compound reacts with the epoxy monomer to form the polyester having hydroxyl group. Preferable amounts of the three components which are brought into reaction as expressed by the mol ratio of the organic compound/the cyclic acid anhydride/the epoxy monomer are about 0.1 to about 0.5/about 1/about 1 to about 1.05. The reaction is conducted at a temperature, for example, of about 50° to about 140° C. A conventional esterification catalyst, such as a tertiary amine or a quaternary ammonium salt, and an organic solvent which does not take part in the reaction may be used if necessary.

Particularly, the aqueous polyurethane having polyoxyethylene units in side chains has excellent adhesion to various kinds of substrates having different polarity and excellent pigment dispersibility.

As the organic polyisocyanate (C), generally known organic polyisocyanates can be used. Examples of such organic polyisocyanates include: diisocyanates, such as tolylene diisocyanate, 4,4'-diphenylmethane diisocyanate, hexamethylene diisocyanate, xylylene diisocyanate, 1,5-naphthalene diisocyanate, isophorone diisocyanate, lysine diisocyanate, hydrogenated 4,4'-diphenylmethane diisocyanate, and hydrogenated tolylene diisocyanate; adducts having isocyanates at both ends formed from glycols or diamines and these diisocyanates; and mixtures of these compounds. Polyisocyanates having three or more functionalities, such as triphenylmethane triisocyanate and polymethylenepolyphenyl isocyanate, can be used as a mixture with these diisocyanates if necessary. Monoisocyanates may also be used as a molecular weight modifier if necessary. Commercial polyisocyanate adduct products, such as products of Desmodur series (products of Bayer, Germany; trade names), may be used as used as well.

Furthermore, an active hydrogen compound ($L^1$) generally used in the preparation of polyurethane, such as a polyhydroxy compound and a polyamine compound, may be used in the present invention. As the polyhydroxy compound, water; a low molecular weight polyol, such as a diol like ethylene glycol, diethylene glycol, triethylene glycol, butanediol, propanediol, 1,6-hexanediol, neopentyl glycol, and cyclohexane-dimethanol, a triol like trimethylolpropane and glycerol, and a tetraol like pentaerythritol; and a high molecular weight diol, such as a polyether diol and a polyester diol; can be used. Furthermore, a bisphenol, such as bisphenol A and bisphenol F; and a glycol prepared by addition of an alkylene oxide, such as ethylene oxide and propylene oxide, to bisphenol A or bisphenol F, can be used as well.

Examples of the polyether diol include: polymers, copolymers and graft copolymers of tetrahydrofuran or alkylene oxide, such as ethylene oxide, propylene oxide, and butylene oxide; polyether glycols prepared by condensation of hexanediol, methylhexanediol, heptanediol, octanediol or mixtures of these diols; and polyether glycols modified with propoxy or ethoxy group.

Examples of the polyester diol include polyester diols obtained by the condensation reaction of a saturated or unsaturated low molecular weight glycol, such as ethylene glycol, propylene glycol, 1,3-butanediol, 1,4-butanediol, neopentyl glycol, hexanediol, methyl-1,5-pentanediol, octanediol, cyclohexanediol, 2-ethyl-1,3-hexanediol, bisphenol A, diethylene glycol, triethylene glycol, and dipropylene glycol, with aliphatic or aromatic dibasic acids or aromatic dibasic acid esters; polyester polyols obtained by the ring-opening polymerization of cyclic esters, such as poly-ε-caprolactone; polycarbonate polyols; and silicone polyols. Hydroxy-terminated reaction products from these compounds and diisocyanates can be used as well.

Examples of the polyamine compound include diamines, such as ethylenediamine, trimethylenediamine, tetramethylenediamine, pentamethylenediamine, 1,7-diaminoheptane, 1,8-diaminooctane, xylylenediamine, 1,4-diaminocyclohexane, isophoronediamine, and phenylenediamine; triamines, such as triaminopropane; amino-terminated or hydroxy-terminated reaction products obtained by reaction of these compounds with organic polyisocyanate compounds or polyepoxy compounds; and the like.

Examples of the polyhydrazine compound (D) include hydrazine; carboxylic acid dihydrazides such as oxalic acid dihydrazide, malonic acid dihydrazide, succinic acid dihydrazide, glutaric acid dihydrazide, adipic acid dihydrazide, sebacic acid dihydrazide, maleic acid dihydrazide, fumaric acid dihydrazide, itaconic acid dihydrazide, and phthalic acid dihydrazide; polyhydrazides of carbonic acid such as carbonic acid dihydrazide; carbodihydrazide; thiocarbodihydrazide; 4,4'-oxybisbenzenesulfonyl hydrazide; polyacrylic acid hydrazide; and the like. Dihydrazides are particularly preferable among these compounds; and the like.

For preparation of the aqueous polyurethane used in the aqueous compositions for ink, coating and adhesive of the present invention, the compound (A) having at least one ionic functional group, the compound (B) having polyoxyethylene units, an excess amount of the organic polyisocyanate (C), and optionally, the active hydrogen compound ($L^1$), all described above, are brought into reaction with each other according to a conventional method at a temperature of room temperature to about 140° C., preferably about 40° to about 100° C., to form the polymer ($P^1$) having terminal isocyanate groups, which is then brought into reaction with the polyhydrazine compound (D).

The polymer ($P^1$) having terminal isocyanate groups can be obtained by reaction of the compound (A) having at least one ionic functional group and at least two functional groups reactive with isocyanate group, the compound (B) having polyoxyethylene units, the organic polyisocyanate (C), and optionally, the active hydrogen compound ($L^1$) containing the polyhydroxy compound described above as the main component thereof, in such amounts that the equivalent ratio of the isocyanate group to the total of the active hydrogen in the compounds (A), (B) and ($L^1$) is about 1.02 to about 3/about 1, preferably about 1.05 to about 2.2/about 1. Furthermore, if necessary, another polymer ($P^2$) having terminal isocyanate groups can be obtained by reaction of the polymer ($P^1$) having terminal isocyanate groups with an active hydrogen compound ($L^2$) which is a conventional chain extender in such amounts that the equivalent ratio of the isocyanate group to the active hydrogen in the compound ($L^2$) is about 1.02 to about 2/about 1, preferably about 1.04 to about 1.7/about 1.

The aqueous polyurethane having terminal hydrazine functional groups can be obtained by reaction of the polymer having terminal isocyanate groups thus obtained with the polyhydrazine compound (D) in such amounts that the equivalent ratio of the hydrazine group to the terminal isocyanate group is about 1.02 to about 2/about 1, preferably about 1.04 to about 1.7/about 1.

When the polymer ($P^1$) having terminal isocyanate groups is brought into reaction with the polyhydrazine compound (D), the active hydrogen compound ($L^2$) may be used additionally. Particularly, because primary diamines have higher reactivities to the isocyanate group than hydrazine groups, hydrazine groups can be left unreacted at the ends when 5% or more of the polyhydrazine compound (D) is contained in the mixture of the polyhydrazine compound and the active hydrogen compound.

The active hydrogen compound ($L^2$) is selected from the active hydrogen compound ($L^1$) described above. For example, a polyol, such as ethylene glycol or butanediol; a primary or secondary aliphatic, alicyclic, aromatic, aralkyl, or heterocyclic amine, particularly diamine, such as ethylenediamine, diaminodiphenylmethane, isophoronediamine, or piperazin; or water; can be used singly or as a mixture of two or more kinds.

In these reactions, conventional catalysts for urethane formation, such as dibutyl tin dilaurate and tin octoate, can be used if necessary.

The preparation of the polymer having terminal isocyanate groups can be conducted in the absence of a solvent. However, an organic solvent inert to the isocyanate group may also be used for achieving homogeneous reaction and adjusting viscosity.

For dispersing or dissolving the aqueous polyurethane into water, the aqueous polyurethane may be dispersed or dissolved into water according to a conventional method after it is prepared. As another method, the molecular weight of the polymer having terminal isocyanate groups described above may be increased with the chain extender or the like while the polymer is dispersed in water or after the polymer is dispersed in water. Conversion of the ionic functional group, for example carboxyl group, in the polymer described above to an ionic group (a base group) may be conducted either before, at the time of, or after addition of the polymer to water. As the agent used for the neutralization, ammonia, a tertiary amine, such as triethylamine, triethanolamine, or N-methylmorpholine, or an alkali metal, is suitable.

The aqueous polyurethane thus obtained can be used without further treatment after it is dispersed in water. However, for the purpose of removing various kinds of organic solvents used together, a process of removing the residual organic solvent by azeotropic distillation with water with heating and evacuating operations is generally adopted.

The present invention relates to aqueous dispersions used for ink, such as printing ink, ink jet ink, and ink for writing tools; coating, such as paint; and adhesive materials. The aqueous ink or coating composition comprises the aqueous dispersion of the aqueous polyurethane, pigments, water, and optionally, water-soluble organic solvents. Contents of the components of the composition are, for example, as follows. The contents are shown in % by weight based on the weight of the composition.

| | |
|---|---|
| (a) the aqueous polyurethane in the aqueous dispersion | about 2 to about 40% by weight |
| (b) pigments | about 2 to about 80% by weight |
| (c) the total water | about 10 to about 96% by weight |
| (d) a water-soluble organic solvent | 0 to about 50% by weight |

The adhesive composition comprises, for example, the components (a), (c) and (d) in a similar manner to the composition described above. In other words, the adhesive composition comprises the three components described above except the component (b) in the contents described above.

The pigment used herein includes conventional colored inorganic and organic pigments. The water-soluble organic solvent includes alcohols, ketones, esters, pyrrolidones, ethers, and the like.

The aqueous dispersion of the present invention can be used as an emulsifier for polymerization. In this case, a conventional vinyl monomer, such as vinyl acetate, styrene, (meth)acrylic acid esters and (meth)acrylic acid, can be copolymerized in the presence of the aqueous polyurethane of the present invention in water to obtain a urethane-vinyl composite resin. The amount of the aqueous polyurethane used differs in accordance with the application of the resultant composite resin, and is preferably about 3 to about 90%.

To the aqueous composition of the present invention, other ingredients can be added if necessary in addition to the pigment and the aqueous organic solvent. Examples of other ingredients include water-insoluble organic solvents, dyestuffs, magnetic powders, fillers, emulsifiers, defoaming agents, surfactants, dispersion co-agents, thickening agents, heat stabilizers, leveling agents, crater preventing agents, precipitation preventing agents, ultraviolet light absorbents, antioxidants, flame retardants, and the like. Aqueous dispersions of other aqueous resins, such as polyesters, polyacrylates, polyvinyl acetate, polybutadiene, polyvinyl chloride, chlorinated polypropylene, polyethylene, polystyrene, polystyrene-acrylate copolymers, rosin derivatives, alcohol adducts of styrene-maleic arthydride copolymer and cellulosic resins, can be additionally used according to the object.

Furthermore, cured coating layers having excellent strength and chemical resistance can be formed by adding conventional crosslinking agents to the aqueous composition of the present invention. For example, when a carboxyl group is incorporated as the ionic functional group, polyaziridine compounds, polyepoxy compounds, polycarbodiimide compounds, metal chelate compounds, polyoxazoline compounds, polyisocyanates, blocked polyisocyanates, partially or totally etherized amino resins, and the like, can be used as the crosslinking agent. Polycarbonyl compounds including polyacetoacetic acid esters, aqueous resins having an acetoacetate group, and aqueous resins having an aldehyde group or a carbonyl group can be used as the curing agent as well.

The aqueous composition of the present invention can be used as an ink, a coating, an adhesive, a fiber treatment agent, or a surface treatment agent. The resin layer can be formed on a desired substrate including paper, wood, metal, glass, fiber, leather, plastic, a foamed article, and the like by a conventional method, such as printing, coating, impregnating and spraying. Particularly, the resin layer has excellent adhesion to non-polar plastic molded articles and plastic films, such as those made of polyethylene or polypropylene, as well as to polar substrates, such as metal and glass.

Particularly when the aqueous composition of the present invention is used as printing ink, it shows excellent adhesion to various kinds of plastics and is well-suited to laminate processing. These characteristics are lacking in conventional aqueous inks.

The aqueous composition of the present invention can also be used as an emulsifier for polymerization reaction in a resin system or in an aqueous system and also as an adhesive for polyethylene, polypropylene, polyester, nylon, polyurethane or leather. It can be used not only for the adhesion of materials of the same type, but also advantageously for the adhesion of substrates having different polarities.

EXAMPLES

The present invention is described in more detail with reference to the following examples; however, the present invention is not limited by the examples in any way. In the following examples, "part" means part by weight and "%" means % by weight.

Example 1

Into a four-necked flask equipped with a thermometer, a stirrer and a reflux cooler, 67.1 parts of polybutylene adipate glycol (hydroxyl value, 56 mg KOH/g), 7.5 parts of polyethylene glycol (hydroxyl value, 56 mg KOH/g), 14.3 parts of dimethylolpropionic acid and 90 parts of methyl ethyl ketone were charged and heated to 80° C. in a nitrogen atmosphere while being stirred. When the temperature was stabilized, 48.0 parts of isophorone diisocyanate was added dropwise to the mixture. Then, a solution of 0.015 parts of dibutyltin dilaurate dissolved in 10 parts of methyl ethyl ketone was added and the mixture was allowed to react for 3 hours at the same temperature to obtain a solution of a prepolymer having terminal isocyanate groups. After the reaction solution was cooled to a temperature of 30° C. or lower, a solution prepared by mixing 11.5 parts of isophoronediamine and 150 parts of acetone was added dropwise to the reaction solution over 1 hour and allowed to react for 30 minutes at the same temperature to obtain a solution of a polymer containing terminal isocyanate groups and having an increased molecular weight. Then, a solution prepared by mixing 1.5 parts of adipic acid dihydrazide, 25 parts of water and 50 parts of acetone was added dropwise. The reaction solution was heated to 50° C. and the reaction was finished. An aqueous dispersion of an aqueous polyurethane was obtained by adding dropwise a solution prepared by mixing 7.2 parts of 25% aqueous ammonia and 320 parts of water to the reaction solution. The solvents in the resultant aqueous dispersion were in a vacuum at 60° C. and an aqueous dispersion of a polyurethane (a) having hydrazine functional groups at the ends and in which 5% of the units in the polyurethane were polyoxyethylene units in the main chain was obtained. The polyurethane (a) had an acid value of 39.8 mg KOH/g before neutralization, and the aqueous dispersion contained 30.1% of non-volatile matter and had a pH of 6.8.

Example 2

Into an apparatus similar to that in Example 1, 45.4 parts of poly-ε-caprolactone glycol (hydroxyl value, 56 mg KOH/g), 7.8 parts of polyethylene glycol (hydroxyl value, 56 mg KOH/g), 20.5 parts of dimethylolpropionic acid and 90 parts of methyl ethyl ketone were charged and heated to 80° C. in a nitrogen atmosphere while being stirred. When the temperature was stabilized, 59.8 parts of isophorone diisocyanate was added dropwise to the mixture. Then, a solution of 0.015 parts of dibutyltin dilaurate dissolved in 10 parts of methyl ethyl ketone was added and the mixture was allowed to react for 3 hours at the same temperature. The reaction solution was cooled to a temperature of 30° C. or lower and a solution of a polymer having terminal isocyanate groups was obtained. Then, 10.5 parts of 25% aqueous ammonia, 345 parts of water and 16.5 parts of adipic acid dihydrazide were charged in another apparatus similar to that used above and heated to 30° C. in a nitrogen atmosphere while being stirred. When the temperature was stabilized, the solution of the polymer having terminal isocyanate groups prepared above was added dropwise to this solution over 1 hour. The reaction solution was heated to 50° C. and the reaction was finished to obtain an aqueous dispersion of an aqueous polyurethane. The solvents in the resultant aqueous dispersion were removed in a vacuum at 60° C. and an aqueous dispersion of a polyurethane (b) having hydrazine functional groups at the ends and in which 5% of the units in the polyurethane were polyoxyethylene units in the main chain was obtained. The polyurethane (b) had an acid value of 57.2 mg KOH/g before neutralization, and the aqueous dispersion contained 30.2% of non-volatile matter and had a pH of 6.9.

Example 3

Into an apparatus similar to that in Example 1, 98.6 parts of polytetramethylene glycol (hydroxyl value, 56 mg KOH/g), 15.0 parts of polyethylene glycol (hydroxyl value, 56 mg KOH/g), 6.7 parts of dimethylolpropionic acid and 90 parts of methyl ethyl ketone were charged and heated to 80° C. in a nitrogen atmosphere while being stirred. When the temperature was stabilized, 27.9 parts of tolylene diisocyanate (a product of Nippon Polyurethane Co., Ltd.; trade name, TDI-80) was added dropwise to the mixture. Then, a solution of 0.015 parts of dibutyltin dilaurate dissolved in 10 parts of methyl ethyl ketone was added and the mixture was allowed to react for 3 hours at the same temperature to obtain a solution of a polymer having terminal isocyanate groups. After the reaction solution was cooled to a temperature of 30° C. or lower, a solution prepared by mixing 2.28 parts of hydrazine monohydrate (an 80% aqueous solution), 25 parts of water and 200 parts of acetone was added dropwise to the reaction solution over 1 hour. The reaction solution was heated to 50° C. and the reaction was finished. An aqueous dispersion of an aqueous polyurethane was obtained by adding dropwise a solution prepared by mixing 3.5 parts of 25% aqueous ammonia and 325 parts of water to the reaction solution. The solvents in the resultant aqueous dispersion were removed in a vacuum at 60° C. and an aqueous dispersion of a polyurethane (c) having hydrazine functional groups at the ends and in which 10% of the units in the polyurethane were polyoxyethylene units in the main chain was obtained. The polyurethane (c) had an acid value of 18.7 mg KOH/g before neutralization, and the aqueous dispersion contained 30.1% of non-volatile matter and had a pH of 6.7.

Example 4

Into an apparatus similar to that in Example 1, 6.2 parts of ethylene glycol, 20 part of succinic anhydride and 413.6 parts of polyethylene glycol methyl glycidyl ether (epoxy equivalent, 2068; average number of polyoxyethylene units contained therein, 45) were charged and dissolved by heating to 100° C. The mixture was stirred for 3 hours at the same temperature. Then, 2 parts of N,N-dimethylbenzylamine as the reaction catalyst was added to the mixture. After the mixture was allowed to react for 7 hours at the same temperature, the acid value was confirmed to be 10 mg KOH/g or lower and a polyester (I) having 96% of the polyoxyethylene units in the side chains was obtained.

Into another apparatus similar to that used above, 68.9 parts of poly(3-methyl-1,5-pentanediol adipate) (hydroxyl value, 56 mg KOH/g), 7.6 parts of the polyester (I) prepared above, 13.9 parts of dimethylolpropionic acid and 90 parts of methyl ethyl ketone were charged and heated to 80° C. in a nitrogen atmosphere while being stirred. When the temperature was stabilized, 46.7 parts of isophorone diisocyanate was added dropwise to the mixture. Then, a solution of 0.015 parts of dibutyltin dilaurate dissolved in 10 parts of methyl ethyl ketone was added and the mixture was allowed to react for 3 hours at the same temperature. The reaction solution was cooled to a temperature of 30° C. or lower and a solution of a polymer containing terminal isocyanate groups was obtained. Then, 7.0 parts of 25% aqueous ammonia, 345 parts of water and 12.9 parts of adipic acid dihydrazide were charged into still another apparatus similar to that used above and heated to 30° C. in a nitrogen atmosphere while being stirred. When the temperature was stabilized, the solution of the polymer containing terminal isocyanate groups prepared above was added dropwise to the solution over 1 hour. The solution was heated to 50° C. and the reaction was finished to obtain an aqueous dispersion of an aqueous polyurethane. The solvents in the resultant aqueous dispersion were removed in a vacuum at 60° C. and an aqueous dispersion of a polyurethane (d) having hydrazine functional groups at the ends and in which 5% of the units in the polyurethane were polyoxyethylene units in the side chains was obtained. The polyurethane (d) had an acid value of 39.7 mg KOH/g before neutralization, and the aqueous dispersion contained 30.2% of non-volatile matter and had a pH of 7.2.

Example 5

Into an apparatus similar to that in Example 1, 201.2 parts of polyethylene glycol monomethyl ether (average number of polyoxyethylene units contained therein, 45; hydroxyl value, 28 mg KOH/g) and 3 parts of potassium hydroxide were charged. The mixture was heated to 120° C. and dehydrated in a vacuum. Then, 7.4 parts of glycidol was added slowly and the reaction was allowed to proceed for about 3 hours. After the reaction mixture was cooled, the added potassium hydroxide was neutralized with acetic acid and the salt which formed was removed by filtration. Thus, an addition polymer of an alkylene oxide (II) containing 96% of polyoxyethylene units and having 2 hydroxyl groups (m=45, n=0) was obtained.

Into another apparatus similar to that used above, 104.0 parts of polycarbonate diol (hydroxyl value, 56 mg KOH/g), 7.5 parts of the addition polymer (II) prepared above, 3.6 parts of dimethylolpropionic acid and 90 parts of methyl ethyl ketone were charged and heated to 80° C. in a nitrogen atmosphere while being stirred. When the temperature was stabilized, 27.5 parts of isophorone diisocyanate was added dropwise to the mixture. Then, a solution of 0.015 parts of dibutyltin dilaurate dissolved in 10 parts of methyl ethyl ketone was added and the mixture was allowed to react for 3 hours at the same temperature. The reaction solution was cooled to a temperature of 30° C. or lower and a solution of a polymer containing terminal isocyanate groups was obtained. Then, 2.0 parts of 25% aqueous ammonia, 345 parts of water and 7.6 parts of adipic acid dihydrazide were charged into still another apparatus similar to that used above and heated to 30° C. in a nitrogen atmosphere while being stirred. When the temperature was stabilized, the solution of the polymer containing terminal isocyanate groups prepared above was added dropwise to the solution over 1 hour. The solution was heated to 50° C. and the reaction was finished to obtain an aqueous dispersion of an aqueous polyurethane. The solvents in the resultant aqueous dispersion were removed in a vacuum at 60° C. and an aqueous dispersion of a polyurethane (e) having hydrazine functional groups at the ends and in which 5% of the units in the polyurethane were polyoxyethylene units in the side chains was obtained. The polyurethane (e) had an add value of 10.0 mg KOH/g before neutralization, and the aqueous dispersion contained 29.9% of non-volatile matter and had a pH of 7.5.

Example 6

Into an apparatus similar to that in Example 1, 84.0 parts of poly(3-methyl-1,5-pentanediol terephthalate) (hydroxyl value, 56 mg KOH/g), 7.5 parts of polyethylene glycol (hydroxyl value, 56 mg KOH/g), 7.2 parts of dimethylolpropionic acid and 90 parts of methyl ethyl ketone were charged and heated to 80° C. in a nitrogen atmosphere while being stirred. When the temperature was stabilized, 37.2 parts of 4,4'-diphenylmethane diisocyanate thawed by heating to 50° C. was added dropwise to the mixture. Then, a solution of 0.015 parts of dibutyltin dilaurate dissolved in 10 parts of methyl ethyl ketone was added and the mixture was allowed to react for 3 hours at the same temperature. The reaction solution was cooled to a temperature of 30° C. or lower and a solution of a polymer containing terminal isocyanate groups was obtained. Then, 3.7 parts of 25% aqueous ammonia, 345 parts of water and 14.6 parts of sebacic acid dihydrazide were charged into another apparatus similar to that used above and heated to 30° C. in a nitrogen atmosphere while being stirred. When the temperature was stabilized, the solution of the polymer containing terminal isocyanate groups prepared above was added dropwise to the solution over 1 hour. The solution was heated to 50° C. and the reaction was finished to obtain an aqueous dispersion of an aqueous polyurethane. The solvents in the resultant aqueous dispersion were removed in a vacuum at 60° C. and an aqueous dispersion of a polyurethane (f) having hydrazine functional groups at the ends and in which 5% of the units in the polyurethane were polyoxyethylene units in the main chain was obtained. The polyurethane (f) had an acid value of 20.0 mg KOH/g before neutralization, and the aqueous dispersion contained 30.5% of non-volatile matter and had a pH of 7.3.

Example 7

Into an apparatus similar to that in Example 1, 95.0 parts of poly(3-methyl-1,5-pentanediol terephthalate adipate) (hydroxyl value, 56 mg KOH/g), 12.0 parts of the addition polymer (II) prepared in Example 5, 3.6 parts of dimethylolpropionic acid and 90 parts of methyl ethyl ketone were charged and heated to 80° C. in a nitrogen atmosphere while being stirred. When the temperature was stabilized, 31.5 parts of 4,4'-dicyclohexylmethane diisocyanate thawed by heating to 50° C. was added dropwise to the mixture. Then, a solution of 0.015 parts of dibutyltin dilaurate dissolved in 10 parts of methyl ethyl ketone was added and the mixture was allowed to react for 3 hours at the same temperature. The reaction solution was cooled to a temperature of 30° C. or lower and a solution of a polymer containing terminal isocyanate groups was obtained. Then, 2.0 parts of 25% aqueous ammonia, 345 parts of water and 7.9 parts of isophthalic acid dihydrazide were charged into another apparatus similar to that used above and heated to 30° C. in a nitrogen atmosphere while being stirred. When the temperature was stabilized, the solution of the polymer containing terminal isocyanate groups prepared above was added dropwise to the solution over 1 hour. The solution was heated to 50° C. and the reaction was finished to obtain an aqueous dispersion of an aqueous polyurethane. The solvents in the resultant aqueous dispersion were removed in a vacuum at 60° C. and an aqueous dispersion of a polyurethane (g) having hydrazine functional groups at the ends and in which 8% of the units in the polyurethane were polyoxyethylene units in the side chains was obtained. The polyurethane (g) had an acid value of 10.3 mg KOH/g before neutralization, and the aqueous dispersion contained 30.2% of non-volatile matter and had a pH of 7.8.

Comparative Example 1

Into an apparatus similar to that in Example 1, 67.4 parts of polybutylene adipate glycol (hydroxyl value, 56 mg KOH/g), 7.5 parts of polyethylene glycol (hydroxyl value, 56 mg KOH/g), 14.3 parts of dimethylolpropionic acid and 90 parts of methyl ethyl ketone were charged and heated to 80° C. in a nitrogen atmosphere while being stirred. When the temperature was stabilized, 48.1 parts of isophorone diisocyanate was added dropwise to the mixture. Then, a solution of 0.015 parts of dibutyltin dilaurate dissolved in 10 parts of methyl ethyl ketone was added and the mixture was allowed to react for 3 hours at the same temperature to obtain a solution of a polymer containing terminal isocyanate groups. The reaction solution was cooled to a temperature of 30° C. or lower. Then, a solution prepared by mixing 11.5 parts of isophorone diamine, 1.1 parts of dibutylamine and 200 parts of acetone was added dropwise to the reaction solution over 1 hour. The solution was heated to 50° C. and the reaction was finished. Then, a solution prepared by mixing 5.5 parts of 25% aqueous ammonia and 345 parts of water was added dropwise to obtain an aqueous dispersion of an aqueous polyurethane. The solvents in the resultant aqueous dispersion were removed in a vacuum at 60° C. and an aqueous dispersion of a polyurethane (h) having hydrocarbon groups at the ends and in which 5% of the units in the polyurethane were polyoxyethylene units in the main chain was obtained. The polyurethane (h) had an acid value of 40.4 mg KOH/g before neutralization, and the aqueous dispersion contained 29.7% of non-volatile matter and had a pH of 7.0.

Comparative Example 2

Into an apparatus similar to that in Example 1, 67.1 parts of polybutylene adipate glycol (hydroxyl value, 56 mg KOH/g), 7.5 parts of polyethylene glycol (hydroxyl value, 56 mg KOH/g), 14.3 parts of dimethylolpropionic acid and 90 parts of methyl ethyl ketone were charged and heated to 80° C. in a nitrogen atmosphere while being stirred. When the temperature was stabilized, 48.0 parts of isophorone diisocyanate was added dropwise to the mixture. Then, a solution of 0.015 parts of dibutyltin dilaurate dissolved in 10 parts of methyl ethyl ketone was added and the mixture was allowed to react for 3 hours at the same temperature to obtain a solution of a polymer containing terminal isocyanate groups. The reaction solution was cooled to a temperature of 30° C. or lower. Then, a solution prepared by mixing 13.0 parts of isophoronediamine, 25 parts of water and 200 parts of acetone was added dropwise to the reaction solution over 1 hour. The solution was heated to 50° C. and the reaction was finished. Then, a solution prepared by mixing 7.2 parts of 25% aqueous ammonia and 320 parts of water was added dropwise to obtain an aqueous dispersion of an aqueous polyurethane. The solvents in the resultant aqueous dispersion were removed in a vacuum at 60° C. and an aqueous dispersion of a polyurethane (i) having amino groups at the ends and in which 5% of the units in the polyurethane were polyoxyethylene units in the main chain was obtained. The polyurethane (i) had an acid value of 39.7 mg KOH/g before neutralization, and the aqueous dispersion contained 29.9% of non-volatile matter and had a pH of 6.9.

Comparative Example 3

Into an apparatus similar to that in Example 1, 67.7 parts of polybutylene adipate glycol (hydroxyl value, 56 mg KOH/g), 7.5 parts of polyethylene glycol (hydroxyl value, 56 mg KOH/g), 14.3 parts of dimethylolpropionic acid and 90 parts of methyl ethyl ketone were charged and heated to 80° C. in a nitrogen atmosphere while being stirred. When the temperature was stabilized, 48.1 parts of isophorone diisocyanate was added dropwise to the mixture. Then, a solution of 0.015 parts of dibutyltin dilaurate dissolved in 10 parts of methyl ethyl ketone was added and the mixture was allowed to react for 3 hours at the same temperature to obtain a solution of a polymer containing terminal isocyanate groups. The reaction solution was cooled to a temperature of 30° C. or lower. Then, a solution prepared by mixing 11.6 parts of isophoronediamine and 150 parts of acetone was added dropwise to the reaction solution over 1 hour and the reaction mixture was allowed to react for 30 more minutes at the same temperature. A solution prepared by mixing 0.78 parts of 1,4-butanediol, 25 parts of water and 50 parts of acetone was added dropwise to the reaction solution. The solution was heated to 50° C. and the reaction was finished. Then, a solution prepared by mixing 7.2 parts of 25% aqueous ammonia and 320 parts of water was added dropwise to obtain an aqueous dispersion of an aqueous polyurethane. The solvents in the resultant aqueous dispersion were removed in a vacuum at 60° C. and an aqueous dispersion of a polyurethane (j) having hydroxyl groups at the ends and in which 5% of the units in the polyurethane were polyoxyethylene units in the main chain was obtained. The polyurethane (j) had an acid value of 39.8 mg KOH/g before neutralization, and the aqueous dispersion contained 30.1% of non-volatile matter and had a pH of 6.8.

Comparative Example 4

Into an apparatus similar to that in Example 1, 76.1 parts of polytetramethylene glycol (hydroxyl value, 56 mg KOH/g), 37.5 parts of polyethylene glycol (hydroxyl value, 56 mg KOH/g), 6.7 parts of dimethylolpropionic acid and 90 parts of methyl ethyl ketone were charged and heated to 80° C. in a nitrogen atmosphere while being stirred. When the temperature was stabilized, 27.9 parts of tolylene diisocyanate (a product of Nippon Polyurethane Co., Ltd.; trade name, TDI-80) was added dropwise to the mixture. Then, a solution of 0.015 parts of dibutyltin dilaurate dissolved in 10 parts of methyl ethyl ketone was added and the mixture was allowed to react for 3 hours at the same temperature to obtain a solution of a polymer containing terminal isocyanate groups. The reaction solution was cooled to a temperature of 30° C. or lower. Then, a solution prepared by mixing 2.28 parts of hydrazine monohydrate (an 80% aqueous solution), 25 parts of water and 200 parts of acetone was added dropwise to the reaction solution over 1 hour. The solution was heated to 50° C. and the reaction was finished. Then, a solution prepared by mixing 3.4 parts of 25% aqueous ammonia and 325 parts of water was added dropwise to obtain an aqueous dispersion of an aqueous polyurethane. The solvents in the resultant aqueous dispersion were removed in a vacuum at 60° C. and an aqueous dispersion of a polyurethane (k) having hydrazine functional groups at the ends and in which 25% of the units in the polyurethane were polyoxyethylene units in the main chain was obtained. The polyurethane (k) had an acid value of 18.7 mg KOH/g before neutralization, and the aqueous dispersion contained 30.1% of non-volatile matter and had a pH of 6.7.

Comparative Example 5

Into an apparatus similar to that in Example 1, 112.7 parts of polybutylene adipate glycol (hydroxyl value, 56 mg KOH/g), 7.5 parts of polyethylene glycol (hydroxyl value, 56 mg KOH/g), 0.64 parts of dimethylolpropionic acid and 90 parts of methyl ethyl ketone were charged and heated to 80° C. in a nitrogen atmosphere while being stirred. When the temperature was stabilized, 21.6 parts of isophorone diisocyanate was added dropwise to the mixture. Then, a solution of 0.015 parts of dibutyltin dilaurate dissolved in 10 parts of methyl ethyl ketone was added and the mixture was allowed to react for 3 hours at the same temperature to obtain a solution of a prepolymer containing terminal isocyanate groups. The reaction solution was cooled to a temperature of 30° C. or lower. Then, a solution prepared by mixing 6.6 parts of isophoronediamine and 150 parts of acetone was added dropwise to the reaction solution over 1 hour. The reaction solution was allowed to react for 30 more minutes at the same temperature to obtain a solution containing the polymer having terminal isocyanate groups with an increased molecular weight. Then, a solution prepared by mixing 0.9 parts of adipic acid dihydrazide, 25 parts of water and 50 parts of acetone was added dropwise into the reaction solution. The solution was heated to 50° C. and the reaction was finished. Then, a solution prepared by mixing 7.2 parts of 25% aqueous ammonia and 320 parts of water was added dropwise to obtain an aqueous dispersion of an aqueous polyurethane. The solvents in the resultant aqueous dispersion were removed in a vacuum at 60° C. and an aqueous dispersion of a polyurethane (l) having hydrazine functional groups at the ends and in which 5% of the units in the polyurethane were polyoxyethylene units in the main chain was obtained. The polyurethane (l) had an acid value of 1.8 mg KOH/g before neutralization, and the aqueous dispersion contained 30.3% of non-volatile matter and had a pH of 7.0. Precipitates formed in the aqueous dispersion prepared above after a month at room temperature. The aqueous dispersion had inferior storage stability.

Comparative Example 6

Into an apparatus similar to that in Example 1, 23.9 parts of polybutylene adipate glycol (hydroxyl value, 56 mg KOH/g), 7.5 parts of polyethylene glycol (hydroxyl value, 56 mg KOH/g), 40.0 parts of dimethylolpropionic acid and 90 parts of methyl ethyl ketone were charged and heated to 80° C. in a nitrogen atmosphere while being stirred. When the temperature was stabilized, 73.2 parts of isophorone diisocyanate was added dropwise to the mixture. Then, a solution of 0.015 parts of dibutyltin dilaurate dissolved in 10 parts of methyl ethyl ketone was added and the mixture was allowed to react for 5 hours at the same temperature. The reaction solution was cooled to a temperature of 30° C. or lower to obtain a solution of a polymer containing terminal isocyanate groups. Then, a solution prepared by mixing 20.5 parts of 25% aqueous ammonia, 332 parts of water and 5.4 parts of adipic acid dihydrazide was added dropwise to the reaction solution over 1 hour. The solution was heated to 50° C. and the reaction was finished to obtain an aqueous dispersion of an aqueous polyurethane. The solvents in the resultant aqueous dispersion were removed in a vacuum at 60° C. and an aqueous dispersion of a polyurethane (m) having hydrazine functional groups at the ends and in which 5% of the units in the polyurethane were in the polyoxyethylene units in the main chain was obtained. The polyurethane (m) had an acid value of 112 mg KOH/g before neutralization, and the aqueous dispersion contained 30.2% of non-volatile matter and had a pH of 7.2.

Comparative Example 7

Into an apparatus similar to that in Example 1, 88.0 parts of poly(3-methyl-1,5-pentanediol terephthalate) (hydroxyl value, 56 mg KOH/g), 7.5 parts of polyethylene glycol (hydroxyl value, 56 mg KOH/g), 7.2 parts of dimethylolpropionic acid and 90 parts of methyl ethyl ketone were charged and heated to 80° C. in a nitrogen atmosphere while being stirred. When the temperature was stabilized, 38.0 parts of 4,4'-diphenylmethane diisocyanate thawed in advance at 50° C. was added dropwise to the mixture. Then, a solution of 0.015 parts of dibutyltin dilaurate dissolved in 10 parts of methyl ethyl ketone was added and the mixture was allowed to react for 5 hours at the same temperature. The reaction solution was cooled to a temperature of 30° C. or lower to obtain a solution of a polymer containing terminal isocyanate groups. Then, a solution prepared by mixing 3.7 parts of 25% aqueous ammonia, 332 parts of water and 9.1 parts of isophoronediamine was added dropwise to the reaction solution over 1 hour. The solution was heated to 50° C. and the reaction was finished to obtain an aqueous dispersion of an aqueous polyurethane. The solvents in the resultant aqueous dispersion were removed in a vacuum at 60° C. and an aqueous dispersion of a polyurethane (n) having amino groups at the ends and in which 5% of the units in the polyurethane were polyoxyethylene units in the main chain was obtained. The polyurethane (n) had an acid value of 20 mg KOH/g before neutralization, and the aqueous dispersion contained 30.1% of non-volatile matter and had a pH of 7.5.

The contents of the ionic functional group and the polyoxyethylene (EO) unit and the type of the end group in the polyurethane obtained in Examples 1 to 7 and Comparative Examples 1 to 7 are shown in Table 1.

TABLE 1

Molecular structure of the polyurethanes

| | polyurethane resin No. | content of EO unit (% by wt.) | content of ionic functional group (milliequiv./100 g resin) | end group |
|---|---|---|---|---|
| Example 1 | (a) | 5 (main chain) | 71 | hydrazine group |
| Example 2 | (b) | 5 (main chain) | 102 | hydrazine group |
| Example 3 | (c) | 10 (main chain) | 33 | hydrazine group |
| Example 4 | (d) | 5 (side chain) | 69 | hydrazine group |
| Example 5 | (e) | 5 (side chain) | 18 | hydrazine group |
| Example 6 | (f) | 5 (main chain) | 36 | hydrazine group |
| Example 7 | (g) | 8 (side chain) | 18 | hydrazine group |
| Comparative Example 1 | (h) | 5 (main chain) | 71 | hydrocarbon group |
| Comparative Example 2 | (i) | 5 (main chain) | 71 | amino group |
| Comparative Example 3 | (j) | 5 (main chain) | 71 | hydroxyl group |
| Comparative Example 4 | (k) | 25 (main chain) | 33 | hydrazine group |
| Comparative Example 5 | (l) | 5 (main chain) | 3 | hydrazine group |
| Comparative Example 6 | (m) | 5 (main chain) | 199 | hydrazine group |
| Comparative Example 7 | (n) | 5 (main chain) | 36 | amino group |

Examples 8 to 10

Aqueous printing ink was prepared by a conventional method according to the formulation shown below by using the aqueous dispersions of the polyurethane resins (a), (b) and (d) obtained in Examples 1, 2 and 4, respectively. The compositions were diluted with a mixed solvent of water/isopropanol=1/1 in such a manner that each composition showed a viscosity of 18 seconds (25° C.) with a Zahn cup (a product of Rigosha Co., Ltd.). The diluted compositions were printed on a polyester film (PET) (a product of TOYOBO Co., Ltd.; Ester E5100; thickness, 12 μm) treated with corona discharge and a polypropylene film (OPP) (a product of TOYOBO Co., Ltd.; Pylen P2161; thickness 20 μm) treated with corona discharge. Printing was effected on the surface treated with corona discharge by using a gravure form plate having plate depth of 25 μm at the drying temperature of 60° C. and at the printing speed of 80 m/minute. Each sample was evaluated with respect to adhesion, strength of the extrusion laminate, and coloring property which illustrates the degree of pigment dispersibility.

| | |
|---|---|
| aqueous polyurethane resin/water dispersion | 21 parts/49 parts |
| phthalocyanine blue pigment (a product of Toyo Ink Mfg. Co., Ltd.; Lionol Blue KLH) | 18 parts |
| water | 6.9 parts |
| (total water | 55.9 parts) |
| isopropyl alcohol | 5 parts |
| silicone defoaming agent (a product of Toray Silicone Co., Ltd.; Toray Silicone SC5540) | 0.1 parts |

Results of the evaluation are shown in Table 2. The evaluations were made in accordance with the following methods.

Coloring test: The appearance of the printed product was visually observed, and based on the evaluations of density, gloss and transparency, a total evaluation was made and one of the following marks was awarded:

5 grades: 5: excellent 4: good 3: fair 2: poor 1: very poor

Adhesion test: After the printed product was left standing for 1 day, cellophane tape was adhered to the printed surface and then peeled rapidly. The condition of the printed layer after peeling was evaluated by visual observation of the appearance of the layer, and one of the following marks was awarded:

5 grades: 5:100% remaining 4:80 to 100% remaining 3:50 to 80% remaining 2:30 to 50% remaining 1:30% or less remaining p1 Extrusion laminate test: Melt polyethylene was laminated to the printed product by using a polyethyleneimine anchor coating agent with a extrusion laminator. A 15 mm wide sample was cut from the prepared laminate 2 days after the laminate had been prepared. T-type peeling strength was measured for the sample.

Comparative Examples 8 to 13

Using the aqueous dispersions of the polyurethane resins (h) to (m) obtained in Comparative Examples 1 to 6, respectively, aqueous printing ink compositions were prepared and evaluated in accordance with the same method as that in Examples 8 to 10. Results of the evaluation are shown in Table 2.

TABLE 2

Results of evaluation of aqueous printing ink compositions

| | polyurethane resin No. | coloring property | adhesion | | laminate strength (g/15 mm) | |
|---|---|---|---|---|---|---|
| | | | OPP | PET | OPP | PET |
| Example 8 | (a) | 4 | 5 | 5 | 120 | 160 |
| Example 9 | (b) | 4 | 5 | 5 | 110 | 150 |
| Example 10 | (d) | 4 | 5 | 5 | 130 | 180 |
| Comparative Example 8 | (h) | 4 | 1 | 5 | 20 | 120 |
| Comparative Example 9 | (i) | 4 | 1 | 5 | 30 | 140 |
| Comparative Example 10 | (j) | 4 | 1 | 5 | 20 | 130 |
| Comparative Example 11 | (k) | 3 | 4 | 4 | 50 | 80 |
| Comparative Example 12 | (l) | 2 | 5 | 5 | 180 | 200 |
| Comparative Example 13 | (m) | 5 | 3 | 3 | 50 | 40 |

As shown in Table 2, the aqueous printing ink compositions containing the aqueous polyurethanes of the present invention show excellent dispersibility of pigment, superior adhesion to various kinds of substrates, and outstanding processability in the lamination.

Examples 11 and 12

Using the aqueous dispersions containing the polyurethane resins (c) and (e) obtained in Examples 3 and 5, respectively, the following components were mixed by stirring and then kneaded for 20 hours using a ball mill to prepare aqueous white coating compositions.

| | |
|---|---|
| aqueous polyurethane resin/water dispersion | 15 parts/35 parts |
| titanium oxide pigment (a product of Ishihara Sangyo Co., Ltd.; Tipaque R-930) | 35 parts |
| water | 10 parts |
| (total water | 45 parts) |
| isopropyl alcohol | 5 parts |

Each aqueous white coating composition thus prepared was coated on the following three types of substrates by using a bar coater in such a manner that the dry thickness of the coating layer was 10 μm. After the solvents were removed by vaporization at 70° C. for 5 minutes, dry coating layers were formed.

Substrates: molded plate of polyethylene (PE) plate of polycarbonate (PC) plate of aluminum (Al)

Comparative Example 14

Using the aqueous dispersion of the polyurethane resin (i) obtained in Comparative Example 2, dry coating layers were prepared and evaluated in accordance with the same method as that in Examples 11 and 12.

Tests of water resistance, adhesion and gloss were conducted for the coating layers obtained in Examples 11 and 12 and Comparative Example 14 in accordance with the following methods. Results of the evaluation are shown in Table 3.

Water resistance: The coating layer was rubbed repeatedly with a cotton stick which was wet with water. The number of times the coating layer was rubbed was counted, and the number of the rubbing when the coating layer was peeled was recorded.

Adhesion test: A grid peeling test of the coating layer was conducted with cellophane tape. The number of grids on which the coating layer remained per the original number of grids (%) was counted.

Gloss test: Gloss was measured with a glossmeter, and light intensity of 60 degree reflection (%) was obtained.

TABLE 3

Results of evaluation of the aqueous coating compositions

| | polyurethane resin No. | water resistance | adhesion PE plate | adhesion PC plate | adhesion Al plate | gloss |
|---|---|---|---|---|---|---|
| Example 11 | (c) | 50 or more | 100 | 100 | 100 | 75 |
| Example 12 | (e) | 50 or more | 100 | 100 | 100 | 84 |
| Comparative Example 14 | (i) | 50 or more | 10 | 100 | 80 | 34 |

As shown in Table 3, the aqueous coating compositions containing aqueous dispersions of the present invention show excellent water resistance, superior adhesion to various kinds of substrates, and outstanding gloss. The excellent gloss signifies excellent dispersibility of pigments. In particular, the aqueous coating compositions containing the aqueous dispersion of the present invention show excellent adhesion to both polar and non-polar substrates.

Examples 13 and 14

A polyester resin (III) having carboxylate used in the formulation of the aqueous polyurethane resin of the present invention was prepared according to the following method.

Into an apparatus similar to that in Example 1, 500 parts of isophthalic acid, 290 parts of adipic acid, 90 parts of ethylene glycol, 210 parts of neopentyl glycol and 300 parts of 1,6-hexanediol were charged and heated to 160° to 240° C. in a nitrogen atmosphere while being stirred, and the esterification reaction was carried out. When the acid value reached 15 mg KOH/g or less, the pressure was gradually reduced. Polymerization was conducted at 1 mmHg or less at 240° C. for 2 hours to obtain a polyester resin containing hydroxyl group and having an acid value of 0.5 mg KOH/g and a hydroxyl value of 12.0 mg KOH/g. To 600 parts of the resultant polyester resin, 24 parts of trimellitic anhydride was added and the reaction was allowed to proceed for 2 hours at 180° C. to obtain a polyester resin having carboxyl groups at the molecular ends (add value, 23 mg KOH/g). Then, after 100 parts of the polyester resin was dissolved in 100 parts of isopropyl alcohol, a solution obtained by mixing 100 parts of water and 17.4 parts of 25% aqueous ammonia was added slowly while the mixture was stirred to obtain an aqueous dispersion. The solvents in the resultant aqueous dispersion were removed in a vacuum at 60° C. and an aqueous dispersion of the polyester resin (III) containing carboxylate was obtained. The aqueous dispersion contained 50.3% of non-volatile matter and had a pH of 7.3.

Using the polyurethane resins (f) and (g) obtained in Examples 6 and 7, respectively, aqueous adhesive compositions were prepared according to the following formulation.

| | |
|---|---|
| aqueous polyurethane resin/water dispersion | 30 parts/70 parts |
| polyester resin (III)/water dispersion | 10 parts/10 parts |
| polyethyleneimine crosslinking agent (a product of Nippon Shokubai Co., Ltd.; Chemitite PZ-33) | 3 parts |
| isopropyl alcohol | 20 parts |
| water | 70 parts |
| (total water | 150 parts) |

Composite laminate materials of nylon film/aluminum foil/unstretched polypropylene film were prepared by using the two types of aqueous adhesive composition, and were evaluated with respect to adhesion, heat resistance and resistance to foods. The test methods were as follows.

Peeling test:

Substrate: nylon film (thickness, 15 μm), aluminum foil (thickness, 9 μm) and unstretched polypropylene film (thickness, 70 μm)

Amount of coating of the aqueous adhesive composition: 4 to 5 g/m²

Curing condition: 40° C./1 day

Testing sample: Each aqueous adhesive composition was coated on the nylon film by using a dry laminator. After the solvents were removed by vaporization, the coated film was adhered to the surface of aluminum foil. The same aqueous adhesive composition was coated on the other side of the aluminum foil by using a dry laminator. After the solvents were removed by vaporization, the surface of the aluminum foil coated with the adhesive composition was adhered to the unstretched polypropylene film and the adhesive composition was cured.

The testing sample prepared above was cut to a size of 200 mm×25 mm and a T-type peeling test was conducted for this sample by using a tensile tester at the extension speed of 300 mm/minute according to ASTM D1876-61. The peeling strength (kg/25 mm width) between the unstretched polypropylene film and the aluminum foil was measured and the average of data from 10 testing samples was recorded.

Test for heat resistance and resistance to foods:

A bag was readied by placing therein a laminate having a multi-layer structure of nylon film/adhesive/aluminum foil/adhesive/unstretched polypropylene film, which was prepared according to the same method as that for preparing the testing sample used in the peeling test. The bag was packed with meat sauce. After the packed bag was treated with hot water sterilization at 135° C. for 30 minutes (retorting treatment), the peeling strength (kg/25 mm width) between the unstretched polypropylene film and the aluminum foil was measured.

Results of the evaluation are shown in Table 4.

Comparative Example 15

Using the polyurethane resin (n) obtained in Comparative Example 7, an aqueous adhesive composition was prepared by the same formulation as that in Examples 13 and 14 and was evaluated according to the same method as that in Examples 13 and 14. Results of the evaluation are shown in Table 4.

TABLE 4

Result of evaluation of aqueous adhesive compositions

|  | polyurethane resin No. | peeling strength (kg/25 mm width) | |
|---|---|---|---|
|  |  | before retorting | after retorting |
| Example 13 | (f) | 1.3 | 1.1 |
| Example 14 | (g) | 1.6 | 1.4 |
| Comparative Example 15 | (n) | 0.8 | 0.6 |

As shown in Table 4, the aqueous adhesive compositions containing the aqueous polyurethane of the present invention show excellent adhesion when laminated to different kinds of substrates and excellent resistance to hot water.

What is claimed is:

1. An aqueous dispersion of an aqueous polyurethane, consisting essentially of an aqueous polyurethane having ends, said polyurethane comprising an ionic functional group, polyoxyethylene units, and hydrazine functional groups, said hydrazine functional groups consisting of terminal hydrazine functional groups linked to the ends of said polyurethane, wherein the content of the ionic functional group is about 5 to about 180 milliequivalent per 100 g of the aqueous polyurethane and the content of the polyoxyethylene units is about 20% by weight or less based on the weight of the aqueous polyurethane, said aqueous polyurethane having no carbonyl functional groups which react with said hydrazine functional groups.

2. An aqueous dispersion according to claim 1, wherein the aqueous polyurethane is an aqueous polyurethane having terminal hydrazine functional groups obtained by reaction of:

(1) a polymer having terminal isocyanate groups obtained by reaction of a compound (A) having at least one ionic functional group and at least two functional groups reactive with isocyanate group, a compound (B) having polyoxyethylene units and an organic polyisocyanate (C); with (2) a polyhydrazine compound (D).

3. An aqueous dispersion according to claim 1, wherein the aqueous polyurethane is an aqueous polyurethane having terminal hydrazine functional groups obtained by reaction of:

(1) a polymer ($P^1$) having terminal isocyanate groups obtained by reaction of a compound (A) having at least one ionic functional group and at least two functional groups reactive with isocyanate group, a compound (B) having polyoxyethylene units, an organic polyisocyanate (C), and optionally, an active hydrogen compound ($L^1$), in such amounts that the equivalent ratio of the isocyanate group to the total of the active hydrogen in the compounds (A), (B) and ($L^1$) is about 1.02 to about 3/about 1, or optionally, a polymer ($P^2$) having terminal isocyanate functional groups obtained by reaction of the polymer; ($P^1$) with an active hydrogen compound ($L^2$) in such amounts that equivalent ratio of the isocyanate group to the active hydrogen in the compound ($L^2$) is about 1.02 to about 2/about 1; with (2) a polyhydrazine compound (D);

in such amounts that the equivalent ratio of the hydrazine group to the terminal isocyanate group is about 1.02 to about 2/about 1.

4. An aqueous dispersion according to claim 1, wherein the ionic functional group is a member selected from the group consisting of quaternary ammonium group, tertiary amino group, carboxylate group, carboxyl group, sulfonate group, sulfonic acid group, phosphonium group, phosphinic acid group, sulfuric acid ester group, and mixtures of these groups.

5. An aqueous dispersion according to claim 2, wherein the compound (B) having polyoxyethylene units is a diol (E) having polyoxyethylene units in side chains.

6. An aqueous dispersion of an aqueous polyurethane comprising an ionic functional group, polyoxyethylene units and terminal hydrazine functional groups, said aqueous polyurethane being obtained by reaction of:

(1) a polymer having terminal isocyanate groups obtained by reaction of:

a compound (A) having at least one ionic functional group and at least two functional groups reactive with an isocyanate group, a polyester (F) having polyoxyethylene units, said polyester (F) being obtained by reaction of an organic compound having two hydroxyl groups, a cyclic acid anhydride, and a monomer having one epoxy group and polyoxyethylene units, and an organic polyisocyanate (C); with (2) a polyhydrazine compound, wherein the content of the ionic functional group is about 5 to about 180 milliequivalent per 100 g of the aqueous polyurethane and the content of the polyoxyethylene units is about 20% by weight or less based on the weight of the aqueous polyurethane.

7. An aqueous dispersion according to claim 2, wherein the compound (B) having polyoxyethylene units is a poly (alkylene oxide) polymer (G) represented by the following general formula (1):

X—(O—C$_2$H$_4$)$_m$—(O—Y)$_n$—OCH$_2$CH(OH)CH$_2$OH  formula (1)

wherein X indicates a hydrocarbon group having 1 to about 4 carbon atoms, Y indicates a hydrocarbon group having about 3 to about 8 carbon atoms, m indicates an integer of 1 to about 100, and n indicates an integer which is equal to or less than m and not negative.

8. An aqueous dispersion according to claim 2, wherein the polyhydrazine compound (D) is a dihydrazide.

9. An aqueous dispersion according to claim 6, wherein the organic compound having two hydroxyl groups is a member selected from the group consisting of low molecular weight diols and high molecular weight diols.

10. An aqueous dispersion according to claim 6, wherein the cyclic acid anhydride is a member selected from the group consisting of aliphatic dicarboxylic acid anhydrides, aromatic dicarboxylic acid anhydrides and heterocylcic dicarboxylic acid anhydrides.

11. An aqueous dispersion according to claim 6, wherein the monomer having one epoxy group and polyoxyethylene units is a monomer represented by the following general formula (2):

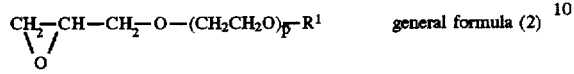   general formula (2)

wherein p indicates an integer of 1 to about 100, and $R^1$ indicates one of a saturated alkyl group, an unsaturated alkyl group, an aryl group, a hetero-ring group and a polypropylene oxide group having one of these functional groups at the end thereof, the alkyl group, the aryl group and the hetero-ring group being substituted with halogen atoms or unsubstituted.

12. An aqueous ink or coating composition comprising the aqueous dispersion described in claim 1, pigment, water, and optionally, a water-soluble organic solvent, wherein the content of the aqueous polyurethane in the aqueous dispersion is about 2 to about 40% by weight, the content of the pigment is about 2 to about 80% by weight, the total content of water is about 10 to about 96% by weight, and the content of the water-soluble organic solvent is 0 to about 50% by weight, each content based on the weight of the aqueous ink or coating composition.

13. An aqueous adhesive composition comprising the aqueous dispersion described in claim 1, water, and a water-soluble organic solvent, wherein the content of the aqueous polyurethane in the aqueous dispersion is about 2 to about 40% by weight, the total content of water is about 10 to about 96% by weight and the content of the water-soluble organic solvent is 0 to about 50% by weight, each content based on the weight of the aqueous adhesive composition.

14. An aqueous ink or coating composition according to claim 12, wherein the aqueous polyurethane in the aqueous dispersion is an aqueous polyurethane having terminal hydrazine functional groups obtained by reaction of:

(1) a polymer having terminal isocyanate groups obtained by reaction of a compound (A) having at least one ionic functional group and at least two functional groups reactive with isocyanate group, a compound (B) having polyoxyethylene units and an organic polyisocyanate (C); with (2) a polyhydrazine compound (D).

15. An aqueous adhesive composition according to claim 13, wherein the aqueous polyurethane in the aqueous dispersion described in claim 1 is an aqueous polyurethane having terminal hydrazine functional groups obtained by reaction of:

(1) a polymer having terminal isocyanate groups obtained by reaction of a compound (A) having at least one ionic functional group and at least two functional groups reactive with isocyanate group, a compound (B) having polyoxyethylene units and an organic polyisocyanate (C); with (2) a polyhydrazine compound (D).

16. An aqueous dispersion of an aqueous polyurethane according to claim 1, wherein said aqueous polyurethane has urethane bonds and at least one selected from the group consisting of ester bonds, urea bonds, and carboxyl groups, said aqueous polyurethane having no carbonyl groups other than those present in the urethane bonds, the ester bonds, the urea bonds, and the carboxyl groups.

* * * * *